United States Patent
Majumdar et al.

(10) Patent No.: US 11,058,998 B2
(45) Date of Patent: Jul. 13, 2021

(54) ISOMER SEPARATION WITH HIGHLY FLUORINATED POLYMER MEMBRANES

(71) Applicant: COMPACT MEMBRANE SYSTEMS INC., Newport, DE (US)

(72) Inventors: Sudipto Majumdar, Newark, DE (US); Robert Daniel Lousenberg, Wilmington, DE (US)

(73) Assignee: Compact Membrane Systems Inc., Newport, DE (US)

( * ) Notice: Subject to any disclaimer, the term of this patent is extended or adjusted under 35 U.S.C. 154(b) by 129 days.

(21) Appl. No.: 16/551,617

(22) Filed: Aug. 26, 2019

(65) Prior Publication Data

US 2020/0061547 A1 Feb. 27, 2020

Related U.S. Application Data

(60) Provisional application No. 62/723,310, filed on Aug. 27, 2018.

(51) Int. Cl.
| | |
|---|---|
| *B01D 71/32* | (2006.01) |
| *B01D 71/58* | (2006.01) |
| *B01D 69/12* | (2006.01) |
| *B01D 61/00* | (2006.01) |
| *B01D 61/36* | (2006.01) |
| *C08L 27/18* | (2006.01) |
| *C08L 37/00* | (2006.01) |

(52) U.S. Cl.
CPC .......... *B01D 71/32* (2013.01); *B01D 61/007* (2013.01); *B01D 61/362* (2013.01); *B01D 69/12* (2013.01); *B01D 69/122* (2013.01); *B01D 71/58* (2013.01); *C08L 27/18* (2013.01); *C08L 37/00* (2013.01); *B01D 2323/08* (2013.01); *B01D 2323/10* (2013.01); *C08L 2203/16* (2013.01)

(58) Field of Classification Search
CPC .... B01D 61/007; B01D 61/362; B01D 69/12; B01D 69/122; B01D 71/32; B01D 71/58; B01D 71/76; B01D 2323/08; B01D 2323/10; C08L 27/18; C08L 37/00; C08L 2203/16
See application file for complete search history.

(56) References Cited

U.S. PATENT DOCUMENTS

| | | | | |
|---|---|---|---|---|
| 6,723,152 B2 * | 4/2004 | Bikson | ............... | B01D 53/228 95/45 |
| 6,770,202 B1 * | 8/2004 | Kidd | .................. | B01D 53/228 210/321.6 |
| 6,899,743 B2 * | 5/2005 | Wijmans | ............... | B01D 3/145 210/640 |
| 8,506,814 B2 * | 8/2013 | Gonzalez | ............... | B01D 71/32 210/640 |
| 10,843,133 B2 * | 11/2020 | Sirkar | ................. | B01D 61/025 |
| 2004/0000231 A1 * | 1/2004 | Bikson | ................. | B01D 69/12 95/45 |
| 2011/0266220 A1 * | 11/2011 | Campos | ............ | B01D 39/1692 210/640 |

OTHER PUBLICATIONS

B. Smitha et al., "Separation or organic-organic mixtures by pervaporation—a review," *Journal of Membrane Science* 2004 241(1) 1-21.
P.R. Resnick et al., "Teflon™ AF Amorphous Fluoropolymers," J. Schiers, Ed., *Modern Fluoropolymers*, John Wiley & Sons, New York 1997 397-420.
Robeson, L. M., "The Upper Bound Revisited," *Journal of Membrane Science* 2008 320 390-400.

* cited by examiner

*Primary Examiner* — John Kim

(74) *Attorney, Agent, or Firm* — Devlin Law Firm LLC; James M. Lennon

(57) ABSTRACT

Separation of linear and branched alkane isomers via selective permeation through a composite membrane is disclosed. The separation layer in the composite membrane is fabricated from a blend of at least two different fluoropolymer compositions, A and B, in which composition A has a normal-alkane isomer permeability that is greater than composition B. Composition B has a normal alkane to branched-alkane isomer selectivity that is equal or greater than composition A. The separation layer in the composite membrane has a normal-alkane permeability that is greater than composition B and a normal-alkane to branched alkane isomer selectivity that is greater than composition A.

14 Claims, No Drawings

ISOMER SEPARATION WITH HIGHLY FLUORINATED POLYMER MEMBRANES

CROSS REFERENCE TO RELATED APPLICATIONS

This application claims the benefit of priority to U.S. Provisional Patent Application No. 62/723,310, filed on Aug. 27, 2018, the disclosure of which is incorporated by reference herein in its entirety.

FIELD OF THE INVENTION

Pervaporation separation of organic-compound mixtures using a composite membrane is disclosed. The composite membrane comprises a separation layer comprising a blend of at least two different fluoropolymer compositions having different permeability and selectivity properties.

BACKGROUND OF THE INVENTION

Industrial separations of organic-compound mixtures such as alkane isomer mixtures by traditional methods such as distillation can be challenging due to similar volatilities of the components. Some of the most difficult separations in the petrochemical industry involve the separation of mixtures of normal "linear-chain" from branched alkanes. These usually large-scale distillation processes are capital-intensive and can require significant energy input for effective separation. Membrane-based separation processes such as pervaporation on the other hand can be a much lower-energy alternative to distillation. Pervaporation is a membrane method of separating a fluid mixture and consists of introducing a fluid feed mixture on one side of the membrane. Selective permeation of components in the feed mixture occurs through the membrane. The permeated species then evaporate from the other side of the membrane. In general, a driving force is necessary to fascinate the pervaporation process. A driving force can be achieved by applying a pressure differential across the membrane which can include applying a vacuum or using a sweep gas at the membrane permeate-side.

Membrane pervaporation separation of hydrocarbon mixtures is known and was reviewed by B. Smitha et al. in "Separation or organic—organic mixtures by pervaporation—a review," *Journal of Membrane Science* 2004 241(1) 1-21, which is hereby incorporated by reference. In particular, the pervaporation separation of alkane-isomers was also reviewed and the cited literature described membranes that were based on inorganic zeolite separation layers. Zeolite membranes have very small pores with diameters of approximately 5.5 angstroms that may be greater than the minimum kinetic radius of certain normal alkanes but less than that of branched alkanes. Consequently, diffusion of certain alkanes was faster and the membranes were more selective for normal-alkane permeation. Additionally, zeolites were known to be highly resistant to degradation at high temperatures in the presence of many organic compounds making them desirable for use in petroleum refinery applications. Despite these advantages there are some drawbacks such as maintaining membrane integrity over large areas due to brittleness and inter-crystalline defects during manufacturing and that also result from sudden and large temperature and pressure swings during operation.

Membranes comprising thin separation layers of organic polymers can be fabricated on large scales with minimal defects and they are usually pliant under changing pressure and temperature conditions Furthermore, U.S. Pat. No. 8,506,814 to Gonzalez et al. disclosed separation of normal from branched hydrocarbons using a non-porous membrane that consisted of a polymer whose chemical structure contained a bis-phenyl-9,9-fluorene group. The bulky structure of the group likely facilitated a large free-volume and high diffusivity to the membrane, which contributed to an overall high membrane permeability. However, there appeared to be a lack of other examples using membranes that were purely hydrocarbon-based. For many non-porous polymer membranes, permeation is based on solution diffusion. The lack of examples may therefore be due to solubility or stability issues of many polymers in the presence of organic compounds at high pressure and temperatures without some mechanism for stabilization.

Many membranes that are based on fluoropolymers that are highly fluorinated or perfluorinated such as Teflon™ AF (Chemours, Wilmington, Del.) or Hyflon™ (Solvay, Houston, Tex.) are notably permeable due to a high free-volume diffusivity imparted by their chemical structures. These fluoropolymers are known for their chemical and thermal stability and they may be effectively inert in the presence of non-fluorinated organic compounds. U.S. Pat. No. 6,899,743 to Wijmans et al. disclosed the pervaporation separation of alkane isomers using membranes comprising a perfluorinated separation layer. Specifically, the patent enabled the gas phase separation of a 1:1 normal-butane to isobutene mixture (C4 alkane isomers) at 80% vapor activity using a composite membrane comprising a Hyflon™ AD 60X separation layer. The normal-butane pressure-normalized flux increased from 3 to 40 gas permeation units (GPU) at temperatures from 20 to 80° C. while the normal-butane selectivity over isobutene decreased from 8.9 to 4.3, respectively.

It is desirable to have even higher pressure-normalized flux in commercial applications while also maintaining or improving on overall selectivity for economical separation of hydrocarbons. However, there tends to be a tradeoff between permeability and selectivity. That is, membrane materials with high permeability tend to have low selectivity and vice versa. This situation is well known in the field of membrane technology and was characterized by the Robeson plot of selectivity versus permeability (Robeson, L. M., "The Upper Bound Revisited," *Journal of Membrane Science* 2008 320 390-400).

SUMMARY OF THE INVENTION

This invention is directed to a selectively-permeable composite membrane and process for pervaporation separation of organic-compound mixtures that include separation of alkane isomer mixtures. The composite membrane comprises a non-porous separation layer that is fabricated from a blend of at least two fluoropolymer components. The fluoropolymer components have different compositions that on their own have either high permeability or high selectivity properties. The blended separation layer in the composite membrane takes advantage of the permeability and selectivity properties of the fluoropolymer components. The composite membrane can be customized for a given separation and has selectivity that is greater than the high-permeability component and permeability that is greater than the high selectivity component in the blended separation layer. Surprisingly, some separation layer blends in certain separations had an isomer selectivity that appeared to go through a maximum value that was greater than either of the fluoropolymer components. The composite membrane and separation process of the invention comprise the following steps of:

a) providing a composite membrane comprising a non-porous separation layer comprising a blend of fluoropolymer comprising, fluoropolymer component A and fluoropolymer component B;

wherein fluoropolymer composition A has a normal-alkane isomer permeability that is greater than fluoropolymer composition B; and wherein fluoropolymer composition B has a normal-alkane to branched-alkane isomer selectivity that is equal or greater than fluoropolymer composition A; and b) exposing the feed-side of the composite membrane to a flowing first organic-compound mixture; and c) providing a driving force and producing a second organic-compound mixture at the permeate-side of the composite membrane that is enriched in at least one of the components of the first organic-compound mixture; and wherein the composite membrane has a normal-alkane permeability that is greater than fluoropolymer composition B and a normal-alkane to branched-alkane isomer selectivity that is greater than fluoropolymer composition A.

The selectively-permeable separation layer is fabricated from a blend of at least two fluoropolymer compositions having different permeability and selectivity properties. The fluoropolymer compositions are minimally semi-crystalline or amorphous such that they will dissolve in a solvent or solvent mixture to form a blended solution suitable for fabrication of the separation layer by casting. For example, certain fluoropolymer compositions that are copolymers containing cyclic structures in their repeat units are amorphous and known for their selective permeability due to free-volume and diffusivity that was facilitated by the bulky cyclic structure. Some of these fluoropolymer compositions were also known to have high glass transition temperatures. Glassy fluoropolymers with transition temperatures that are higher than steady-state temperatures encountered in membrane separations are more thermally stable and are advantageous in certain applications.

Herein, copolymer compositions comprising cyclic repeat-units from perfluoro(2,2-dimethyl-1,3-dioxole) (PDD) were amorphous, glassy, soluble, and useful as either the high permeability or high-selectivity component in a blended membrane, depending on the PDD mole fraction in the copolymer. Copolymers that comprised PDD with tetrafluoroethylene were preferred. These are commercially available as Teflon™ AF (The Chemours Co., Wilmington, Del.). Teflon™ AF 2400, which is reported to contain 83 mole percent PDD and 17% tetrafluoroethylene, has a 240° C. glass transition temperature and was known for its higher permeability but lower selectivity relative to similar fluoropolymers having a lower PDD content. Teflon™ AF 1600, which is reported to contain 65 mole percent PDD and 35% tetrafluoroethylene, has a 160° C. glass transition temperature, lower permeability but higher selectivity than AF 2400.

The blended composite membrane of the invention is useful for separation of organic-compound mixtures and particularly useful for pervaporation separation of C4 to C12 alkane isomer mixtures. The blended composite membrane might also be used for separation of other mixtures that comprise organic compounds selected from a group consisting of aromatic hydrocarbons, ketones, esters, ethers, amides, alcohols, and halogenated organic compounds. The membrane feed-side is exposed to a flowing first organic-compound mixture. A driving force is provided in which a pressure differential is applied across the membrane. For some separations, a driving force may be achieved by applying a vacuum on the membrane permeate-side or by applying a sweep of an inert gas such as nitrogen. The pressure differential facilities selective permeation of the mixture components across the membrane and results in a second organic-compound mixture at the membrane permeate-side that is enriched in at least one of the components of the first organic-compound mixture. In the separation of alkane isomer mixtures, normal-alkane isomer species permeate through the composite membrane much faster than branched or cyclic isomer species and results in a membrane permeate-side mixture that is enriched in the normal alkane isomer.

DETAILED DESCRIPTION OF THE INVENTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. In addition, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein. The described embodiments are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention. Certain additional terms are also used and some of them are further defined within the following detailed description of the invention.

Fluorinated polymers or fluoropolymers are useful materials for fabrication of the membrane separation layer of the invention. A fluoropolymer is a material containing carbon-fluorine groups. By a carbon-fluorine group is meant a group wherein a fluorine atom is directly bonded to carbon while a carbon-hydrogen group is a group wherein a hydrogen atom is bound directly to a carbon atom. Thus —$CF_2$-groups contains two carbon fluorine groups, while a —$CH_3$ group contains three carbon-hydrogen groups. Thus in a homopolymer of, for example, vinylidene fluoride, in which the repeat groups are —$CH_2CF_2$—, the carbon-hydrogen groups and the carbon-fluorine groups are each 50% of the total of carbon-hydrogen plus carbon-fluorine groups present. The relative amount of carbon-fluorine and carbon-hydrogen groups present can be determined by for example NMR spectroscopy, using $^{13}C$ NMR, or a combination of $^{19}F$ and $^1H$ NMR spectroscopy. In the fluoropolymers of invention herein, of the total of the carbon-hydrogen groups and the carbon fluorine groups preferably at least 10% are carbon-fluorine groups, preferably 50% or more, and very preferably 75% or more. Especially preferred are perfluoropolymers or fluoropolymers in which there are no carbon-hydrogen groups in the polymer-backbone repeating units. Such fluoropolymers may have very small amounts of "adventitious" carbon-hydrogen groups in the backbone from impure monomers, or groups such as initiator fragments bonded to chains.

As previously noted, fluoropolymers that are copolymer compositions comprising cyclic repeat-units from perfluoro (2,2-dimethyl-1,3-dioxole) (PDD) are amorphous, glassy, soluble, and preferred for use as either the high permeability or high-selectivity component in the blend for the separation layer, depending on the PDD mole fraction in the copolymer. Certain compositions that comprise PDD with tetrafluoroethylene are commercially available as Teflon™ AF (The Chemours Co., Wilmington, Del.). For further information about Teflon™ AF, see P. R. Resnick et al. in "Teflon™ AF Amorphous Fluoropolymers," J. Schiers, Ed., *Modern Fluoropolymers*, John Wiley & Sons, New York 1997 397-420, which is hereby incorporated by reference. In general, a copolymer composition having a PDD mole fraction greater than 0.8 is preferred for the high permeability component, component A, of the separation layer whereas a PDD mole fraction less than 0.7 is preferred for the high selectivity component, component B. For either component, the copolymer may also comprise other repeat units containing functional groups such as perfluoroether, ester, alcohol, carboxylate, or other heteroatoms such as chlorine. Alternatively, other fluoropolymer compositions comprising cyclic repeat-units that are different from PDD may also be used, primarily for the high selectivity component of the separation layer. Some of these other fluoropolymers are also commercially available and include Hyflon™ (Solvay, Houston Tex.) and Cytop™ (AGC Inc, Chemicals Company, Tokyo Japan).

Dilute fluoropolymer solutions for each of the high permeability component, component A, and high-selectivity component, component B, for the separation layer are prepared in solvents suitable for casting and at concentrations that are preferably less than 1%, and more preferably between 0.05% and 0.5%. Suitable solvents or solvent mixtures are those that are miscible, dissolve the fluoropolymers, and evaporate at an appropriate rate to form the blended separation layer in a timely manner. For example, suitable solvents include, but are not limited to, fluorinated solvents such as Novec™ FC770, Novec™ HFE7200, Novec™ HFE7300, and Opteon™ SF10. The solutions are subsequently blended to a desired component ratio by quantitative mixing of appropriate quantities of each solution.

Solution casting is a preferred film forming technique to fabricate the separation layer of the composite membrane. Preferred casting techniques include but are not limited to ring casting, dip-coating, spin-coating, slot-die coating, and Mayer rod coating. The blended fluoropolymer solution is cast onto a suitable substrate such as a porous-layer support and the solvent(s) are evaporated to form the blended separation layer. Residual or trace solvent(s) remaining in the layer should not interfere with subsequent processing steps. The separation layer is thin and preferably about 0.01-μm to about 2-μm, and more preferably 0.1-μm to 0.5-μm. The separation layer preferably has a permeance at least 5 times greater than the porous-layer support, more preferably at least 10 times. Permeance, or pressure normalized flux, is usually reported in gas permeance units or GPU and has units of $10^6 \times cm^3(STP)/cm^2/sec/cmHg$. Permeability is further normalized for thickness with units of $10^{10} \times cm^3(STP) \times cm/cm^2/sec/cmHg$ and reported in Barrer.

The porous-layer support reinforces the separation layer and helps to strengthen the composite membrane as a whole such that the membrane may be fabricated into more complex geometries such as spiral-wound or hollow-fiber membrane modules. The porous-layer support may be in the form of a flat sheet, hollow fiber, or tube. Suitable materials for a porous-layer support include but are not limited to polyvinylidine fluoride, expanded polytetrafluoroethylene, polyacrylonitrile, polysulfone, and polyethersulfone. The porous-layer support may also comprise an even stronger backing material such as porous non-woven polyester or polypropylene. Porous inorganic substrates such as silica or alumina are also suitable materials for the porous-layer support. Permeate should flow relatively unobstructed through the usually much thicker porous-layer support having a preferred open porosity that is 40% or greater. The average pore size is preferably less 0.1-μm and more preferably between 0.01 and 0.03-μm.

The composite membrane may be subjected to a thermal treatment step "annealed" to remove residual or trace solvents, and to further improve mechanical durability and long-term permeance and selectivity performance. The separation layer is annealed by heating the composite membrane at temperatures that may approach the glass transition temperatures of the fluoropolymers in the separation layer. The glass transition temperatures will be dependent on fluoropolymer compositions used in the separation layer. Generally, annealing temperatures for the separation layer are between 50 and 250° C., and preferably between 100 to 200° C. The composite membrane is preferably heated for 0.1 to 60 minutes, more preferably for 1 to 5 minutes. The appropriate annealing temperature and time should not degrade the other components of the composite membrane.

EXAMPLES

Example 1

Pervaporation separation of an octane/isooctane isomer mixture using a blended Teflon™ AF 2400/1600 composite membrane: Separate solutions of Teflon™ AF 2400 and AF 1600 were prepared at 0.50% w/w concentrations with magnetic stirring in Novec™ FC770. The solutions were separately filtered using 1-μm glass fiber prior to preparing blended solutions at different ratios. Single component and blended solutions were separately ring-cast on a microporous PVDF substrate, having an average pore size of approximately 0.2-μm, to form the composite membranes. The ring-cast membranes were first air dried and then placed in a 60° C. oven for 1 hour to remove residual solvent. A 47-mm disc was punched from each membrane and separately tested in the pervaporation cell at 80° C. The feed-side of the composite membrane was contacted with a liquid consisting of a 50-50 mixture of octane and isooctane and a helium gas sweep with vacuum was applied on the permeate side. Permeate was collected in a cold trap that was chilled with liquid nitrogen and permeate and feed-liquid compositions were analyzed using a gas chromatograph. The membrane permeance and selectivity for octane and isooctane separation were calculated from the experimental data and are shown in Table 1. The data showed effective separation of the octane/isooctane mixture under pervaporation conditions. Membranes prepared from blends had permeance that was more than 10 times greater than the single component AF1600 membrane and selectivity that was at least 2 times higher than the single component AF2400 membrane.

TABLE 1

| Fluoropolymer Ratio | | Octane Permeance | Selectivity |
|---|---|---|---|
| AF 2400 | AF 1600 | (GPU) | (Octane/Isooctane) |
| 100 | 0 | 5600 | 3 |
| 90 | 10 | 4750 | 6 |
| 50 | 50 | 1250 | 15 |
| 0 | 100 | 100 | 17 |

Example 2

Pervaporation separation of a pentane/Isopentane isomer mixture using a blended Teflon™ AF 2400/1600 composite membrane: Separate solutions of Teflon™ AF 2400 and AF 1600 were prepared at 0.50% w/w concentrations with magnetic stirring in Novec™ FC770. The solutions were separately filtered using 1-μm glass fiber prior to preparing blended solutions at different ratios. Single component and blended solutions were separately cast on a microporous PVDF substrate, having an average pore size of approximately 0.2-μm, using a draw-down table and a #15 Mayer rod. A 47-mm disc was punched from each membrane and separately tested in the pervaporation cell at 22° C. The feed-side of the composite membrane was contacted with a liquid consisting of a 50-50 mixture of pentane and isopentane. A helium gas sweep with vacuum was applied on the permeate side. Permeate was collected in a cold trap that was chilled with liquid nitrogen and permeate and feed-liquid compositions were analyzed using a gas chromatograph. The membrane permeance and selectivity for pentane and isopentane separation were calculated from the experimental data and are shown in Table 2.

TABLE 2

| Fluoropolymer Ratio | | Pentane Permeance | Selectivity |
|---|---|---|---|
| AF 2400 | AF 1600 | (GPU) | (Pentane/Isopentane) |
| 100 | 0 | 8580 | 1.4 |
| 50 | 50 | 6330 | 1.6 |
| 10 | 90 | 2840 | 1.7 |
| 0 | 100 | 2370 | 2.0 |

Example 3

Pervaporation separation of an octane/isooctane isomer mixture using a blended Teflon™ AF 2400/Hyflon® AD 40H composite membrane: Separate solutions of Teflon™ AF 2400 and Hyflon® AD 40H were prepared at 0.50% w/w concentrations with magnetic stirring in Novec™ FC770. The solutions were separately filtered using 1-μm glass fiber prior to preparing blended solutions at different ratios. Single component and blended solutions were separately cast on a microporous PVDF substrate, having an average pore size of approximately 0.2-μm, using a draw-down table and a #15 Mayer rod. A 47-mm disc was punched from each membrane and separately tested in the pervaporation cell at 80° C. The feed-side of the composite membrane was contacted with a liquid consisting of a 50-50 mixture of octane and isooctane. A helium gas sweep with vacuum was applied on the permeate side. Permeate was collected in a cold trap that was chilled with liquid nitrogen and permeate and feed-liquid compositions were analyzed using a gas chromatograph. The membrane permeance and selectivity for octane and isooctane separation are shown in Table 3.

TABLE 3

| Fluoropolymer Ratio | | Octane Permeance | Selectivity |
|---|---|---|---|
| AF 2400 | AD 40H | (GPU) | (Octane/Isooctane) |
| 100 | 0 | 5600 | 3.0 |
| 90 | 10 | 4050 | 3.1 |
| 50 | 50 | 225 | 6.6 |
| 10 | 90 | 155 | 3.0 |
| 0 | 100 | 195 | 2.8 |

Example 4

Pervaporation separation of a pentane/isopentane isomer mixture using a blended Teflon™ AF 2400/Hyflon® AD 40H composite membrane: Separate solutions of Teflon™ AF 2400 and Hyflon® AD 40H were prepared at 0.50% w/w concentrations with magnetic stirring in Novec™ FC770. The solutions were separately filtered using 1-μm glass fiber prior to preparing blended solutions at different ratios. Single component and blended solutions were separately cast on a microporous PVDF substrate, having an average pore size of approximately 0.2-μm, using a draw-down table and a #15 Mayer rod. A 47-mm disc was punched from each membrane and separately tested in the pervaporation cell at 22° C. The feed-side of the composite membrane was contacted with a liquid consisting of a 50-50 mixture of pentane and isopentane. A helium gas sweep with vacuum was applied on the permeate side. Permeate was collected in a cold trap that was chilled with liquid nitrogen and permeate and feed-liquid compositions were analyzed using a gas chromatograph. The membrane permeance and selectivity for pentane and isopentane separation are shown in Table 4.

TABLE 4

| Fluoropolymer Ratio | | Pentane Permeance | Selectivity |
|---|---|---|---|
| AF 2400 | AD 40H | (GPU) | (Pentane/Isopentane) |
| 100 | 0 | 8580 | 1.4 |
| 90 | 10 | 7930 | 1.5 |
| 50 | 50 | 580 | 2.2 |
| 10 | 90 | 120 | 1.7 |
| 0 | 100 | 160 | 1.5 |

Example 5

Pervaporation separation of a dodecane/Isododecane isomer mixture using a blended Teflon™ AF 2400/1600 composite membrane: Separate solutions of Teflon™ AF 2400 and AF 1600 were prepared at 0.50% w/w concentrations with magnetic stirring in Novec™ FC770. The solutions were separately filtered using 1-μ.m glass fiber prior to preparing blended solutions at different ratios. Single component and blended solutions were separately cast on a microporous PVDF substrate, having an average pore size of approximately 0.2-μm, using a draw-down table and a #15 Mayer rod. A 47-mm disc was punched from each membrane and separately tested in the pervaporation cell at 22° C. The feed-side of the composite membrane is contacted with a liquid consisting of a 50-50 mixture of dodecane and isododecane. A helium gas sweep with vacuum is applied on the permeate side. Permeate is collected in a cold trap that is chilled with liquid nitrogen and permeate and feed-liquid compositions are analyzed using a gas chromatograph. The membrane permeance and selectivity for dodecane and isododecane separation are shown in Table 5.

TABLE 5

| Fluoropolymer Ratio | | Dodecane Permeance | Selectivity |
|---|---|---|---|
| AF 2400 | AF 1600 | (GPU) | (Dodecane/Isododecane) |
| 100 | 0 | 1800 | 4 |
| 90 | 10 | 900 | 6 |
| 50 | 50 | 200 | 7 |
| 0 | 100 | 50 | 9 |

What is claimed is:

1. A composite membrane comprising a porous-layer support and a non-porous separation layer comprising a blend of fluoropolymers comprising:
    a) fluoropolymer composition A comprising repeating units from perfluoro(2,2-dimethyl-1,3-dioxole) (PDD) and tetrafluoroethylene (TFE) wherein the PDD mole fraction is greater than 0.8; and
    b) fluoropolymer composition B comprising repeating units from PDD and TFE wherein the PDD mole fraction is less than 0.7; and
    wherein the blend of fluoropolymers contains no more than 90 weight percent of fluoropolymer composition A or 90 weight percent-of fluoropolymer composition B.

2. The composite membrane of claim 1, wherein the porous-layer support has a porosity of 40% or greater and an average pore size between 0.01 µm and 0.1 µm.

3. The composite membrane of claim 1, wherein fluoropolymer composition A contains 83 mole percent PDD and 17 mole percent TFE and fluoropolymer composition B contains 65 mole percent PDD and 35 mole percent TFE.

4. The composite membrane of claim 1, wherein the non-porous separation layer has a thickness of no more than 2 µm.

5. A process for the pervaporation separation of a first organic-compound mixtures using a composite membrane having a feed side and a permeate side, wherein the process comprises:
    a) providing said composite membrane according to claim 1; and
    b) exposing the feed-side of said composite membrane to said first organic-compound mixture that is flowing; and
    c) providing a driving force and producing a second organic-compound mixture at the permeate-side of said composite membrane that is enriched in at least one of the components of said first organic-compound mixture.

6. The process of claim 5, in which at least one of the components of the first organic-compound mixture is selected from a group consisting of: C4 to C12 linear alkanes, C4 to C12 branched alkanes, and C4 to C12 cyclic alkanes.

7. The process of claim 5, wherein the driving force is provided by a pressure differential across the composite membrane between the feed-side and the permeate-side or providing a flow of sweep gas across the permeate side.

8. A method of a making a composite membrane comprising:
    a) providing a porous-layer support;
    b) providing a blend of fluoropolymers comprising:
        i) fluoropolymer composition A comprising repeating units from perfluoro(2,2-dimethyl-1,3-dioxole) (PDD) and tetrafluoroethylene (TFE) wherein the PDD mole fraction is greater than 0.8; and
        ii) fluoropolymer composition B comprising repeating units from PDD and TFE wherein the PDD mole fraction is less than 0.7; and
    c) coating the blend of fluoropolymers on the porous-layer support to produce a non-porous separation layer on the porous-layer support; and
    wherein the blend of fluoropolymers contains no more than 90 weight percent of fluoropolymer composition A or 90 weight percent of fluoropolymer composition B.

9. The method of claim 8, wherein the blend of fluoropolymers further comprises a solvent, and wherein the concentration of the blend of fluoropolymers in the solvent is no more than 1%.

10. The method of claim 9, wherein coating the blend of fluoropolymers on the porous-layer support comprises solution casting.

11. The method of claim 9, wherein the non-porous separation layer has a thickness of no more than 2 µm.

12. The method of claim 11, further comprising annealing the non-porous separation layer on the porous-layer support at a temperature between 50° C. and 250° C. for a time of between 1 and 60 minutes.

13. The method of claim 8, wherein the porous-layer support has a porosity of 40% or greater and an average pore size between 0.01 µm and 0.1 µm.

14. The method of claim 8, wherein fluoropolymer composition-A contains 83 mole percent PDD and 17 mole percent TFE and fluoropolymer composition B contains 65 mole percent PDD and 35 mole percent TFE.

* * * * *